US006736434B2

(12) United States Patent
Anderson et al.

(10) Patent No.: US 6,736,434 B2
(45) Date of Patent: May 18, 2004

(54) VEHICLE AND BUMPER ASSEMBLY THEREFOR HAVING AN INTEGRAL FASCIA AND ENERGY ABSORBER, AND METHOD FOR MAKING THE SAME

(75) Inventors: Jeffrey A. Anderson, Belleville, MI (US); Brian P. Allenspach, Howell, MI (US); Jon F. Baker, Bloomfield Hills, MI (US); Benjamin R. Zabik, Ann Arbor, MI (US)

(73) Assignee: Meridian Automotive Systems, Inc., Dearborn, MI (US)

( * ) Notice: Subject to any disclaimer, the term of this patent is extended or adjusted under 35 U.S.C. 154(b) by 0 days.

(21) Appl. No.: 09/681,341

(22) Filed: Mar. 21, 2001

(65) Prior Publication Data

US 2001/0035658 A1 Nov. 1, 2001

Related U.S. Application Data

(60) Provisional application No. 60/191,221, filed on Mar. 22, 2000.

(51) Int. Cl.⁷ .................................................. B60R 1/03
(52) U.S. Cl. ...................................... 293/102; 293/120
(58) Field of Search ................................ 293/102, 120

(56) References Cited

U.S. PATENT DOCUMENTS

| 4,569,865 A | | 2/1986 | Placek, deceased |
| 4,652,031 A | * | 3/1987 | Loren et al. ................ 293/120 |
| 4,671,550 A | * | 6/1987 | Molnar ........................ 293/120 |
| 4,715,645 A | | 12/1987 | Lewis et al. |
| 5,100,187 A | * | 3/1992 | Loren ........................ 293/110 |
| 5,106,137 A | * | 4/1992 | Curtis ........................ 293/107 |
| 5,114,522 A | | 5/1992 | Takado et al. |
| 5,141,273 A | * | 8/1992 | Freeman ..................... 293/122 |
| 5,154,462 A | * | 10/1992 | Carpenter ................... 293/120 |
| 5,290,078 A | * | 3/1994 | Bayer et al. ................ 293/120 |
| 5,290,079 A | * | 3/1994 | Syamal ....................... 293/120 |
| 5,385,375 A | | 1/1995 | Morgan et al. |
| 5,609,374 A | * | 3/1997 | Sawae et al. ............... 293/102 |
| 5,658,027 A | | 8/1997 | Eissinger et al. |
| 5,711,562 A | * | 1/1998 | Terada et al. ............... 293/120 |
| 5,780,129 A | * | 7/1998 | Ohta ..................... 293/120 X |
| 5,799,991 A | | 9/1998 | Glance |
| 5,927,778 A | | 7/1999 | Uytterhaeghe et al. |
| 5,934,544 A | | 8/1999 | Lee et al. |
| 5,984,389 A | | 11/1999 | Nuber et al. |
| 6,260,893 B1 | * | 7/2001 | Wilson ....................... 293/120 |
| 6,312,028 B1 | * | 11/2001 | Wilkosz ...................... 293/133 |

* cited by examiner

*Primary Examiner*—Joseph D. Pape
(74) *Attorney, Agent, or Firm*—McDonnell Boehnen Hulbert & Berghoff

(57) ABSTRACT

A bumper assembly, alone and in combination with a vehicle, comprising an integral fascia and energy absorber. The integral fascia preferably being thermoformed with the energy absorber. The energy absorber preferably is made from expanded foam beads.

36 Claims, 12 Drawing Sheets

VEHICLE AND BUMPER ASSEMBLY THEREFOR HAVING AN INTEGRAL FASCIA AND ENERGY ABSORBER, AND METHOD FOR MAKING THE SAME

CROSS REFERENCE TO RELATED APPLICATIONS

This application claims the benefit of U.S. Patent Application Serial No. 60/191,221, filed Mar. 22, 2000.

BACKGROUND OF INVENTION

1. Field of the Invention

This invention relates generally to automobile bumpers, and in particular to an improved method for making a vehicular bumper assembly having a fascia with an integral energy absorber.

2. Description of the Related Art

Automobile bumpers typically comprise an impact beam or reinforcement beam, energy absorbers surrounding the impact beam, and a fascia surrounding the energy absorber. The impact beam is typically made of high strength steel or aluminum, attached to the vehicle frame, and effectively provides the impact strength of the bumper. The energy absorber is typically a foam material, although it can alternatively be a hydraulic or gas piston and cylinder assembly. The fascia is the visible exterior of the bumper, and is typically made of plastic.

Referring now to FIG. 1, a prior art bumper system is generally depicted comprising a vehicle 10 with an attached bumper assembly 12. The bumper assembly 12 comprises a bumper beam 20, an energy absorbing layer 22, and a fascia 24. The bumper beam 20 typically comprises a rigid metallic member and is rigidly attached to the frame of the vehicle 10 in a conventional manner. The fascia 24 is typically made of a polymeric material conforming to the color and styling of the vehicle 10. The energy absorbing layer 22 is sandwiched between the fascia 24 and the bumper beam 20. The fascia 24 and energy absorbing layer 22 are attached to the vehicle in a conventional manner, depicted generally in FIG. 1 as utilizing a series of fasteners 14.

Typically, the fascia is manufactured by a high-pressure plastic injection molding process. Current injection molding processes suitable for making the fascia, however, are incapable of molding a fascia which is less than 3 mm thick. It is desirable, however, to provide a fascia having a thickness of less than 3 mm. A reduced thickness would result in less plastic being used to manufacture the bumper, thereby reducing the cost. A reduced thickness would also reduce the weight of the bumper, providing increased fuel efficiency.

In the past, the fascia of bumpers has been painted by way of a spray painting process. This process creates a great deal of environmental concerns and results in the use of expensive equipment to capture the volatile-organic compounds used in the spray painting process. The spray painting process further has relatively high rejection rates due to dirt and other spray painting defects. These and other factors tend to make the spray painting process very costly.

The bumper components have typically been separately shipped to the assembly plant for incorporation into the vehicle. The separate manufacturing and shipping of these components requires expensive packaging to ensure that the components are not damaged during shipment. The separate shipping and manufacturing requires additional floor space at both the manufacturing facility and the assembly plant, and further increases the cost of production.

Bumper fascias that incorporate a foam energy absorbing material are typically manufactured by a two-stage process. The first stage involves forming the fascia. The second stage involves adding the foam material to the fascia piece. This manufacturing process requires additional handling of the pieces, additional tooling, and additional manufacturing time, all adding to the production cost of the piece.

SUMMARY OF INVENTION

It is desirable to have a reduced thickness fascia that is pre-colored and integrally formed with a foam energy absorber to reduce the weight of the bumper, simplify the manufacturing process, and reduce storage space requirements.

In one aspect, the present invention comprises a vehicle comprising a body having a bumper mounting portion thereon, a bumper beam mounted to the bumper mounting portion, a fascia mounted to the vehicle in overlying fashion to the bumper beam, and an energy absorber integrally formed with the fascia and disposed between the fascia and the bumper beam, whereby the fascia and energy absorber can be manufactured, assembled, installed and replaced as a unit. In one embodiment of this aspect of the invention, the fascia has a thickness generally less than 3 mm. In another embodiment, the fascia comprises at least two layers of different materials, in which an outer layer comprises a transparent top coat material with a Class A finished surface, and an inner layer is colored to have an appearance consistent with the color of the vehicle. In another embodiment, the layers further comprise a structural layer, wherein the inner layer is interposed between the outer layer and the structural layer, where the structural layer is made of a relatively inexpensive material compared to the cost of the outer and inner layers, the outer and inner layers are relatively thin compared to the thickness of the structural layer, and the structural layer has a thickness of about 1.5 to 2.0 mm and is formed from recycled materials. In yet another embodiment, the energy absorber is formed from beads of expanded polypropylene, and the energy absorber and fascia can be shipped as a unit due to the integral formation of the energy absorber and the fascia.

In another aspect, the present invention comprises a bumper comprising a bumper beam for mounting to a vehicle, a fascia for mounting to the vehicle in overlying fashion to the bumper beam, and an energy absorber integrally formed with the fascia and disposed between the fascia and the bumper beam, whereby the fascia and energy absorber can be manufactured, assembled, installed and replaced as a unit.

In yet another aspect, the present invention comprises a fascia assembly for a vehicular bumper comprising a fascia having an inner surface and an outer surface, the outer surface having an aesthetic appearance consistent with the styling of a preselected vehicle, and an energy absorber formed integrally with the inner surface of the fascia.

In yet another aspect, the present invention comprises a method of making a fascia assembly for a vehicular bumper in a mold, the fascia assembly comprising a fascia made of a thermoplastic laminate material and an energy absorber, the mold comprising a first mold half having an inner surface defining a cavity and a second mold half defining a core that is movable into the cavity, the core having an outer surface facing the cavity, wherein the mold halves are selectively movable with respect to one another between a retracted position whereby the mold halves have space defined between the two, and a forming position wherein the mold halves contact and the mold core is disposed within the cavity, the method comprising the steps of positioning the thermoplastic laminate material between the mold halves when the mold halves are in the retracted position, clamping the thermoplastic laminate material between the mold halves by moving the mold halves to the forming position, drawing the thermoplastic laminate material against the inner surface of the lower mold half to form the fascia for the vehicular bumper; and injecting a foam material into the cavity to form an energy absorber that is integral with the fascia. In one embodiment of this aspect of the invention, the step of drawing the thermoplastic laminate material against the inner surface of the lower mold half further comprises the step of forming a vacuum between the thermoplastic laminate material and the inner surface of the lower mold half. In another embodiment, the step of drawing the thermoplastic laminate material against the inner surface of the lower mold half further comprises the step of forming a vacuum between the thermoplastic laminate material and the mold core. In yet another embodiment, the step of drawing the thermoplastic laminate material against the inner surface of the lower mold half further comprises the step of introducing pressurized air between the mold core and the thermoplastic laminate material after the drawing of a vacuum therebetween. In yet another embodiment, the step of injecting foam material into the cavity comprises injecting foam beads into the cavity. In yet another embodiment, the method of forming an energy absorber that is integral with the fascia further comprises the step of melting the foam beads by injecting steam into the cavity. In yet another embodiment, the method of forming an energy absorber that is integral with the fascia further comprises the step of compressing the foam beads after they are melted. In yet another embodiment, the step of compressing the foam beads after they are melted further comprises the step of moving the mold core toward the cavity.

These and other benefits, results and objects of the present invention will be apparent to one skilled in the art, in light of the following specification when read in conjunction with the accompanying drawings.

DETAILED DESCRIPTION

Figure 1:
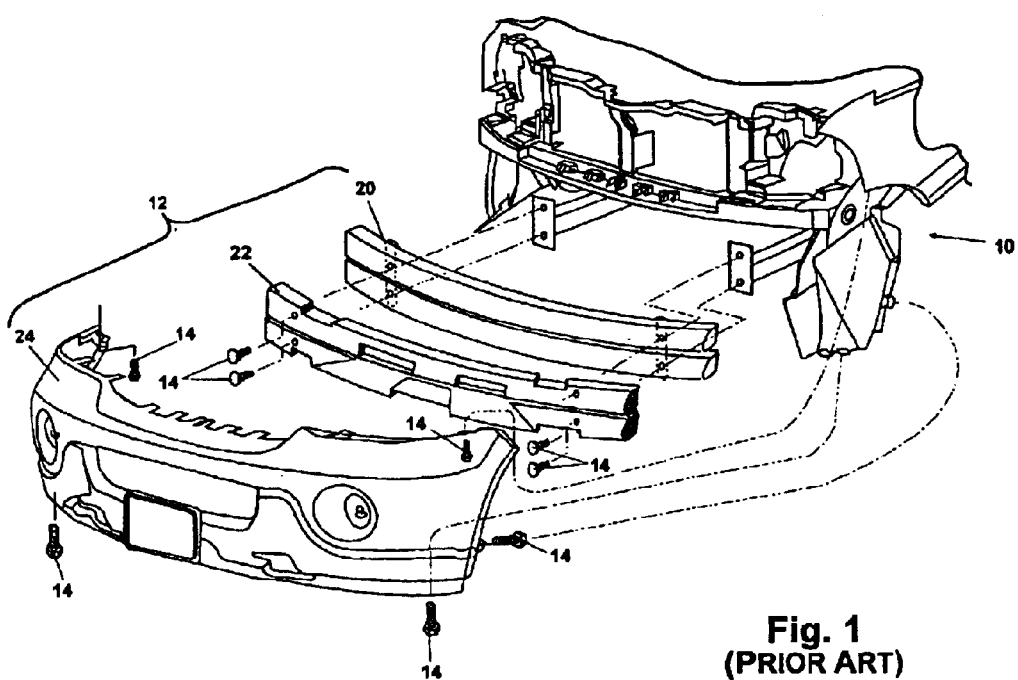
FIG. 1 is an exploded, perspective view of a motor vehicle bumper system incorporating a fascia according to the prior art wherein the energy absorber and fascia are separately formed, manufactured and assembled.
Figure 2:
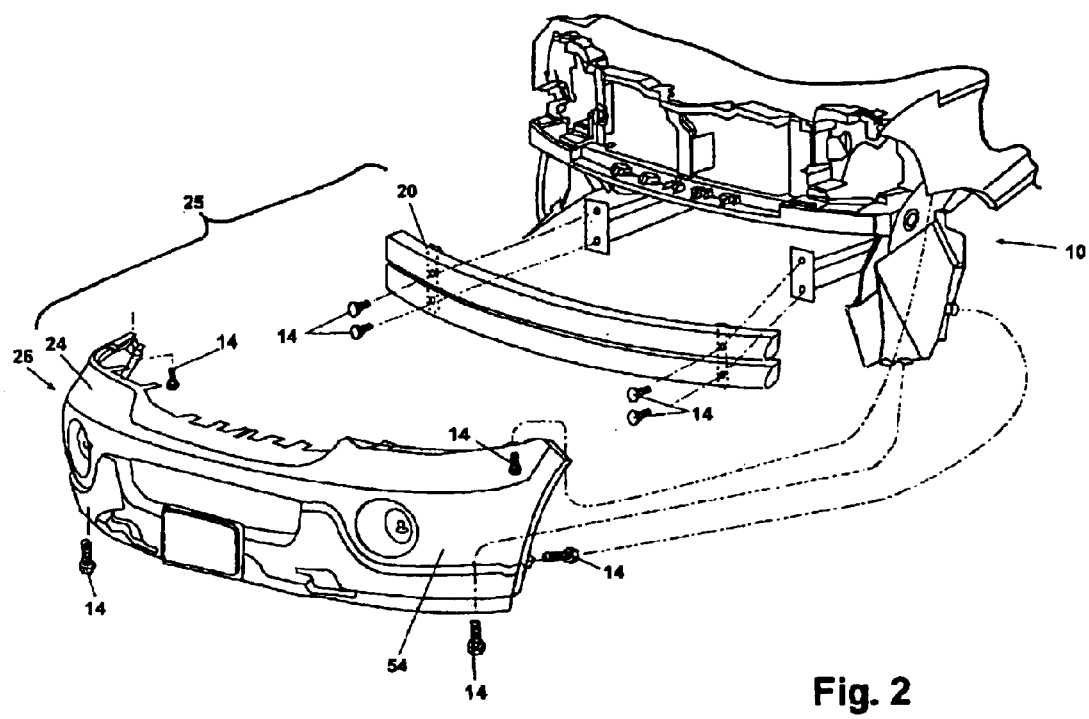
FIG. 2 is an exploded, perspective view of a motor vehicle bumper system incorporating a fascia assembly with an integral energy absorber according to the invention.

Referring now to FIG. 2, a bumper system according to the invention is depicted in which certain elements are the same in the invention and in the prior art. Thus, like numerals will be used to identify like elements. The bumper system comprises a vehicle 10 with an attached bumper assembly 25. The bumper assembly 25 comprises a bumper beam 20, and a fascia assembly 26. The fascia assembly 26 comprises a fascia 24 with an integrated energy absorbing layer 22 as hereinafter described. The fascia assembly 26 is attached to the vehicle through fasteners 14.

Figure 3:
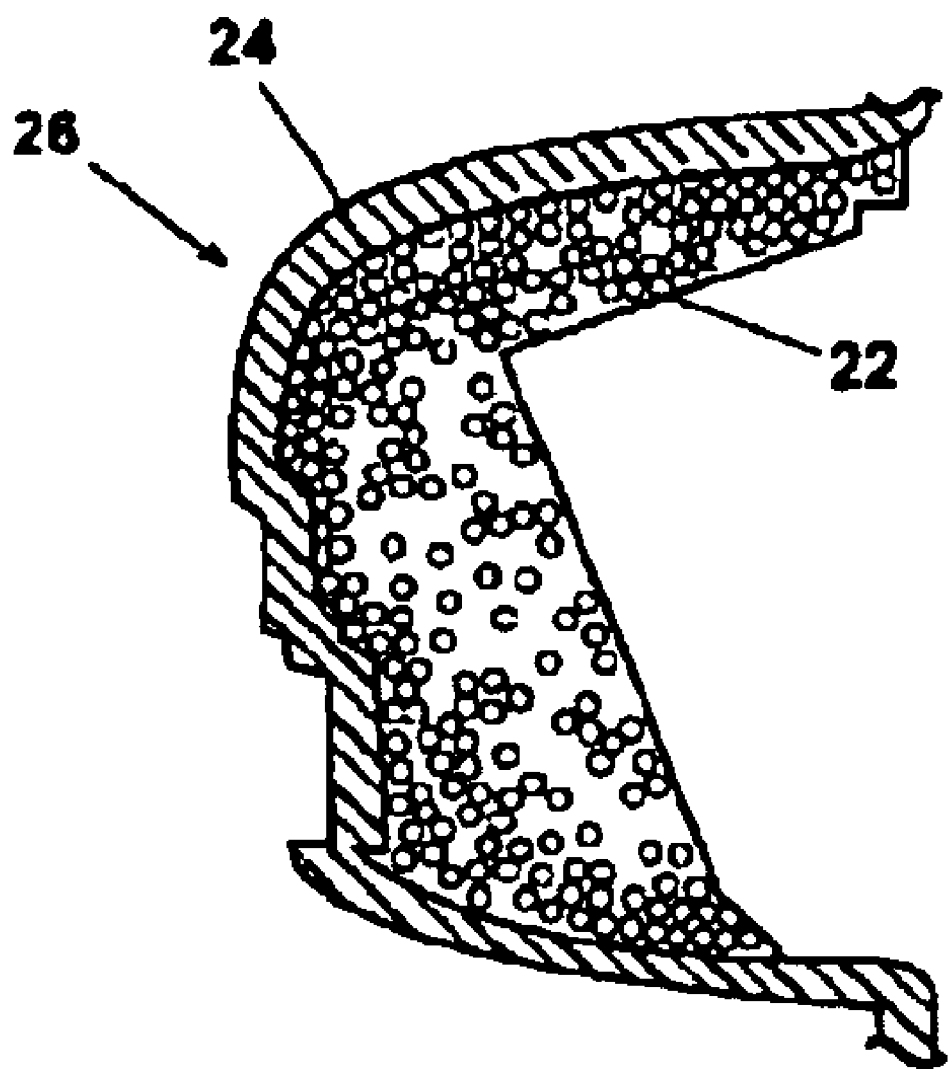
FIG. 3 is a sectioned perspective view of a portion of the fascia assembly of FIG. 2 taken along a vertical direction.

FIG. 3 illustrates a sectional view of a portion of the fascia assembly 26. The fascia 24 is integrally formed with the energy absorbing layer 22, preferably using a thermoforming process. The energy absorbing layer 22 is preferably made from expanded polypropylene and the fascia 24 is preferably made from a molded plastic material, preferably a laminate.

Figure 4:
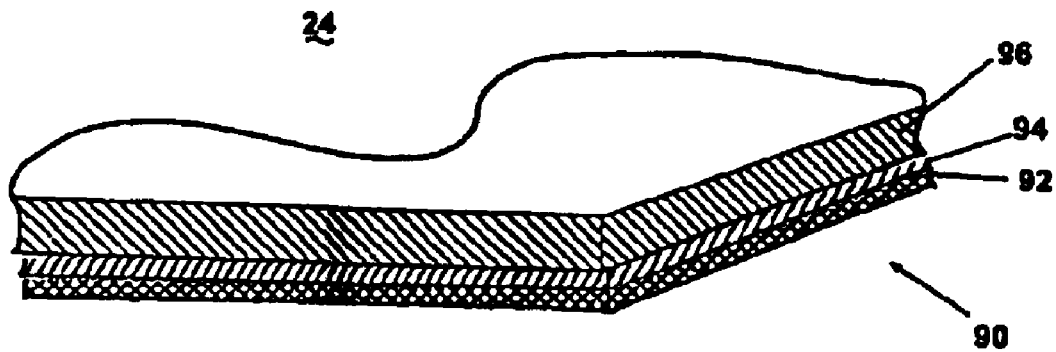
FIG. 4 is a close-up view of the sheet of thermoformable fascia material of FIG. 3 illustrating the various layers of the fascia material.

FIG. 4 illustrates the preferred laminate construction for the fascia 24. The material 90 used to form the fascia assembly 26 is a composite polymeric sheet material comprising three layers 92, 94 and 96. In the preferred embodiment, the first layer 92 comprises a clear acrylic material approximately 0.5 mm thick for providing a Class A surface that is preferred by manufacturers for the exterior of an automobile. In the preferred embodiment, the second layer 94 comprises a color layer approximately 0.5 mm thick. In the preferred embodiment, the third layer 96 comprises a structural layer approximately 1.5 mm thick consisting of recycled polymeric material, which is a less expensive material than the clear acrylic and color materials used in the first two layers 92, 94. The total thickness of the laminate material 90 is thus less than 3 mm, resulting in a fascia 24 that is lighter and less costly than one made by an injection molding process.

Figure 5:
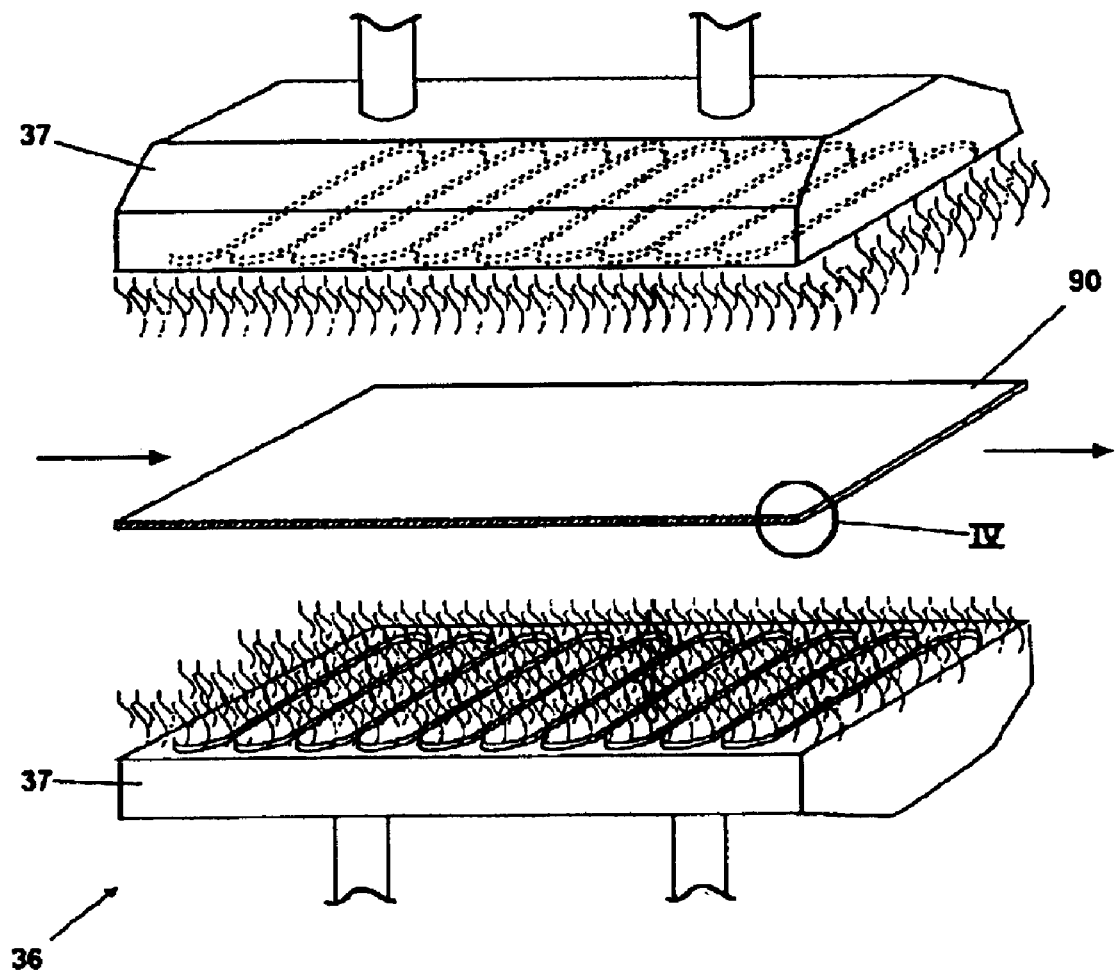
FIG. 5 is a schematic illustration of a sheet of thermoformable fascia material being passed between opposed sources of radiant heat for heating of the fascia material as part of a thermoforming process according to the invention.
Figure 6:
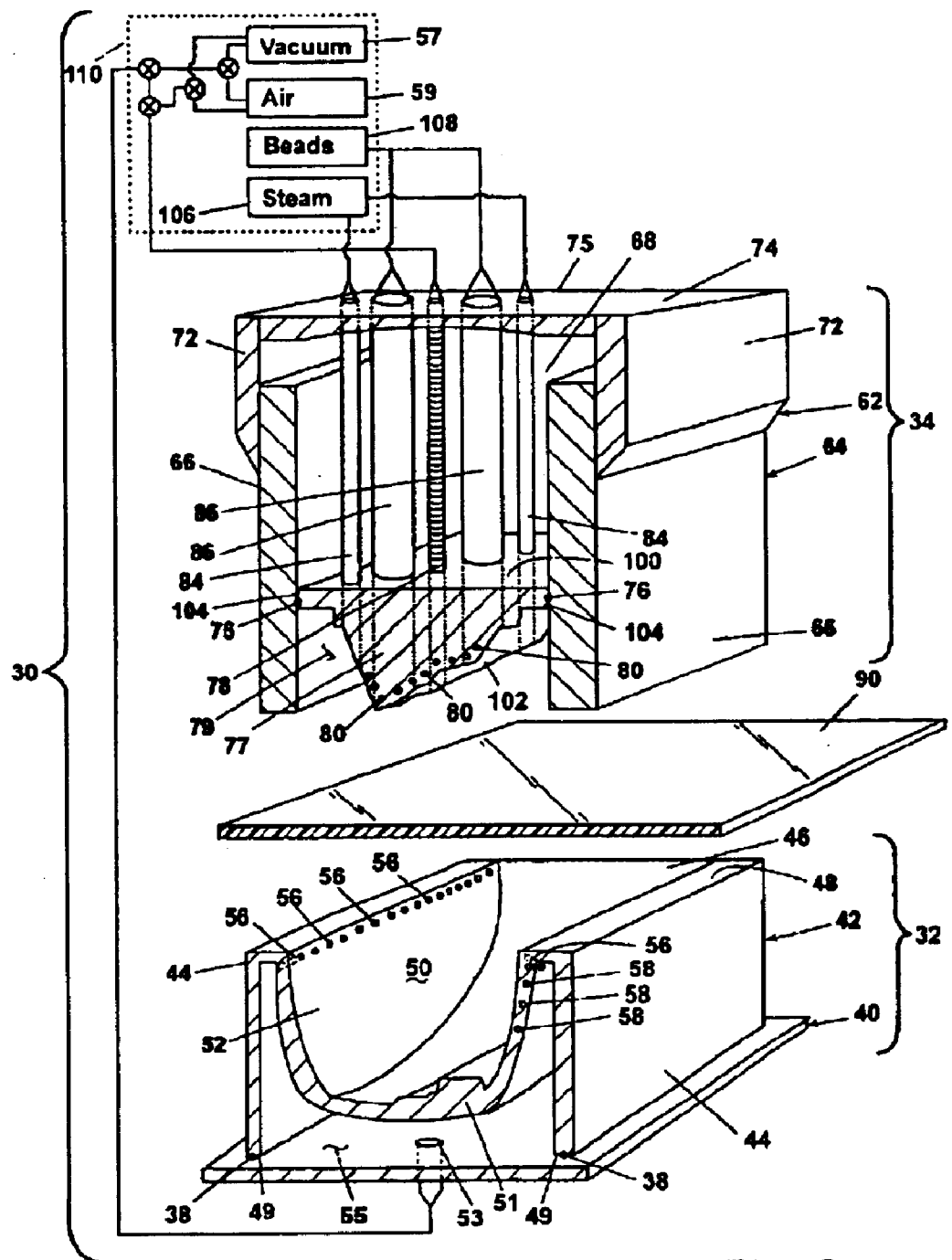
FIG. 6 is a sectioned perspective view of a part of a thermoforming apparatus for forming the fascia of FIG. 2 comprising a cavity tool and a core tool shown in the open position for receiving the fascia.
Figure 7:
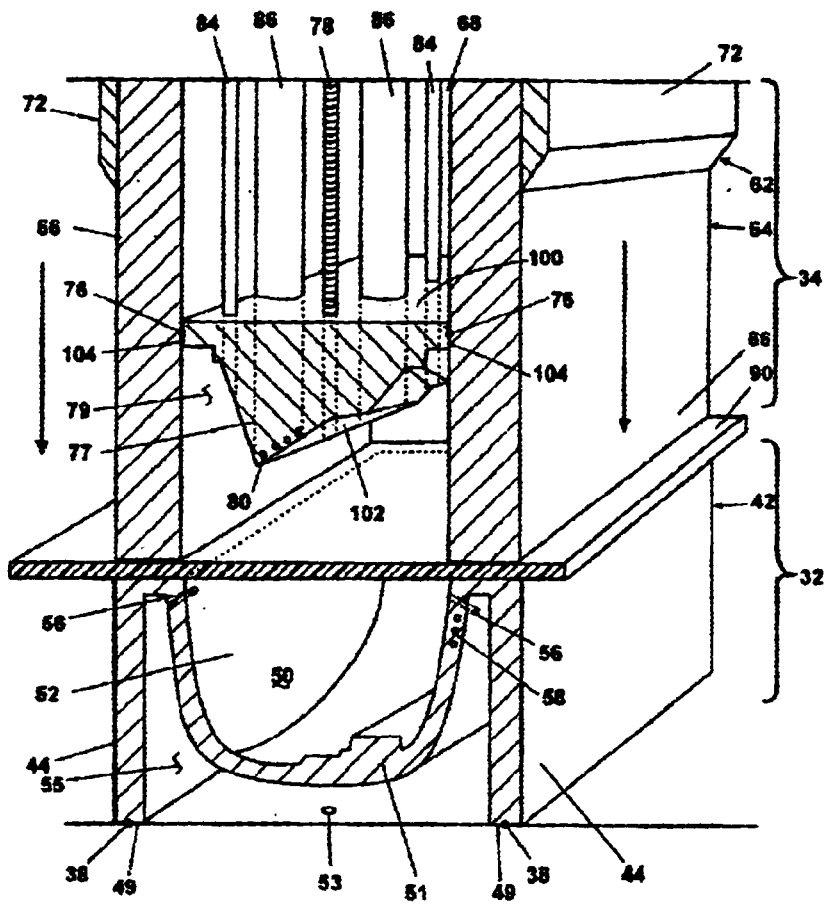
FIG. 7 is a sectioned perspective view of the part of the thermoforming apparatus of FIG. 5 showing the cavity tool and the core tool in a closed or clamping position and forming a mold cavity with the fascia material clamped between the cavity and core tools.
Figure 8:
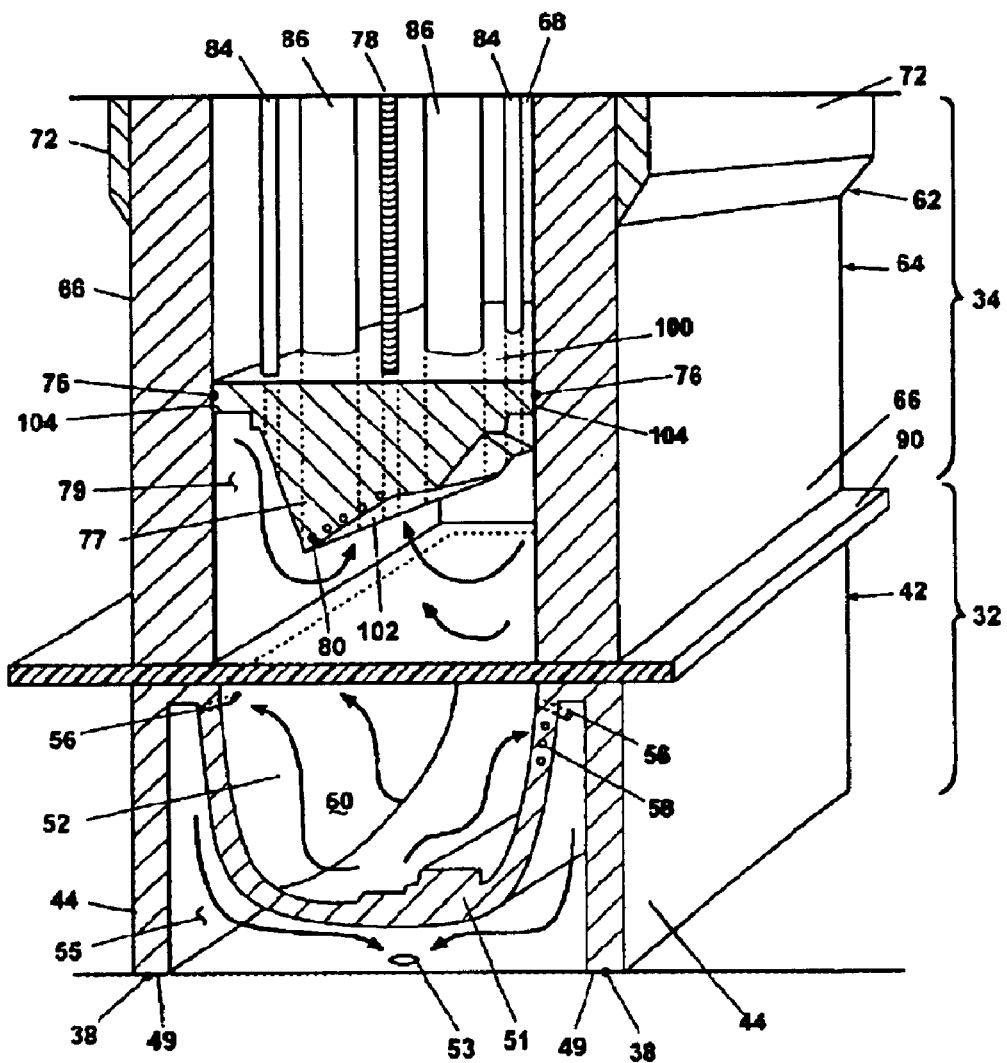
FIG. 8 is a sectioned perspective view of the thermoforming apparatus of FIG. 7 showing evacuation of air from the mold cavity on both sides of the fascia.

The preferred method and apparatus for making the fascia assembly 26 are illustrated in FIGS. 5–11. FIG. 5 illustrates a heating apparatus for heating the material prior to the forming of the fascia 24 integrally with the absorbing layer 22 in the mold shown in FIGS. 6–11.

The heating apparatus 36 is well known in the thermoforming process and preferably comprises spaced radiant heaters 37 between which the material 90 is passed on its way to the mold 30. The radiant heaters can be replaced with many other suitable heaters. Also, the mold 30 can be heated, which eliminates the need for the separate heating apparatus. However, the heated mold is not preferred since it makes the mold 30 more complex in construction and can result in longer cycle times if the mold must be cooled prior to removal of the fascia assembly 27, Referring now to FIG. 6, the fascia mold 30 comprises a cavity tool 32 and a core tool 34. The cavity tool 32 comprises a cavity tool box 42 and a cavity tool base 40 in contact therewith. The cavity tool box 42 is supported by the cavity tool base 40 and is fixedly attached thereto. The cavity tool box 42 is a generally open-top rectangular container-like assembly comprising two opposed sides 44, two opposed ends 46 (only one of which is shown) orthogonal to the sides 44, a top edge 48 orthogonal to the sides 44 and the ends 46, a bottom edge 49, and a cavity wall 51.

Suitable seals 38, such as o-ring type gaskets, are provided between the cavity tool base 40 and the edge 48 to provide an air tight seal between the cavity tool box 42 and the base 40. The box 42 is secured to the base 40 using conventional fasteners (not shown), such as machine screws or bolts, secured into the bottom edge 49. The base 40 is provided with an orifice and conventional high-pressure air fitting 53 for connection to a vacuum source 57 and air supply 59.

The cavity wall 51 has an inner surface 52 that transitions into the top edge 48 and defines a cavity 50 which is open in a generally upward direction as seen in FIGS. 6–11. The inner surface 52 of the cavity wall 51 is shaped and configured to form a Class A-type surface on the sheet when it is drawn against the inner surface which thereby forms the outer surface of the subsequently-formed fascia 24.

The cavity wall 51, sides 44, ends 46, top edge 48, and base 40 define a vacuum chamber 55 when the box 42 is secured to the base 40. The vacuum chamber 55 is fluidly connected to vacuum pump 57 and air supply 59 using a conventional high pressure air line. The upper portion of the cavity wall 51 is provided with vacuum conduits 56 that are regularly spaced along the perimeter adjacent the top edge 48. The vacuum conduits 56 fluidly connect the cavity 50 to the vacuum chamber 55.

The cavity wall 51 is provided with cooling passageways 58 at regularly spaced intervals that are interconnected to provide for the circulation of cooling water therethrough. It will be understood by one skilled in the art that the cooling passageways 58 are fluidly connected to an external source of cooling water (not shown) in a conventional manner incorporating valves and control devices for controlling the introduction of cooling water into the passageways 58, and such a system is not detailed here.

The core tool 34 comprises a core tool box 62, a ring die 64, and a core mold 77. The core tool box 62 is a generally rectangular box-like structure comprising sides 72, a top 74, and ends 75 (only one of which is shown). The ring die 64 is a generally rectangular box-like structure comprising sides 66 and ends 68 (only one of which is shown). The ring die 64 is slidably received within the core tool box 62 for relative movement thereof. The core tool box 62 is provided with an actuator system, such as conventional hydraulic actuators well-known to one skilled in the art (not shown) that position and retract the core tool box 62 independently of the ring die 64, as hereinafter described. The ring die 64 is provided with an actuator system, such as conventional hydraulic actuators well-known to one skilled in the art (not shown) that position and retract the ring die 64 independently of the core tool box 62 and core mold 77, as hereinafter described.

The core mold 77 is a generally elongated, irregularly-shaped member comprising an upper surface 100, a lower surface 102, and a perimeter edge 104. The lower surface 102 conforms generally to the shape of a rear surface of the energy absorbing layer 22 that conforms to and is positioned against the bumper beam 20 when assembled. The upper surface 100 is typically planar, and the perimeter edge 104 is orthogonal thereto. The perimeter edge 104 is in slidable communication with the interior surfaces of the sides 66 and the ends 68 of the ring die 64. The perimeter edge 104 is provided with suitable seals 76, such as gaskets made of Delrin or other durable material, to provide an air tight seal between the perimeter edge 104 and the interior perimeter surfaces of the ring die 64 while enabling the relative movement thereof. The space bounded by the lower surface 102, the sides 66 and ends of 68 of the ring die 64, and the sheet 90 when restrained between the ring die 64 and cavity tool box 42 as hereinafter described define a ring die cavity 79. In the preferred embodiment, the core mold 77 is rigidly attached to the core tool box 62 through rigid supports extending between the upper surface 100 and the underside of the core tool box top 74 (not shown) so that the core mold 77 moves with the movement of the core tool box 62 as hereinafter described. Alternatively, the conduits 78, 84, and 86 hereinafter described may provide the rigid connection between the core mold 77 and the core tool box 62.

The core mold 77 is provided with conduits 78, 84, and 86 therethrough for the conveyance of vacuum and air, steam, and foam beads, respectively. The vacuum conduits 78 extend from the upper surface 100 through the top 74 of the core tool box 34, and are fluidly connected to a vacuum source 57. The steam conduits 84 extend from the upper surface 100 to the top 74 of the core tool box 34, and are fluidly connected to a steam source 106. The foam bead conduits 86 extend from the upper surface 100 through the top 74 of the core tool box 34, and are fluidly connected to a supply of beads 108. In the preferred embodiment, the foam beads are expanded polypropylene beads. The properly sequenced introduction of vacuum, air, steam and foam beads into the mold is precisely controlled by a controller 110, such as a combination of electromechanical devices, logic circuits, hydraulic components, or other suitable devices well-known to one skilled in the art. The core mold 77 is provided with cooling passageways 80 at regularly spaced intervals that are interconnected to enable the circulation of cooling water therethrough. The cooling conduits 80 are fluidly connected to a source of cooling water (not shown). The introduction and control of cooling water in the cavity tool 32 and core tool 34 may also be controlled by the controller 110.

The molding of a fascia assembly 26 and energy absorbing layer 98 will now be described with reference to FIGS. 5–11. As a preliminary step, the fascia mold 30 is installed in a conventional press machine (not shown) and the various hydraulic, air, cooling water, steam, and foam bead lines are connected to the cavity tool 32 and core tool 34. The cavity tool 32 and core tool 34 are aligned in a first position to receive the fascia material 90 therebetween.

Figure 9:
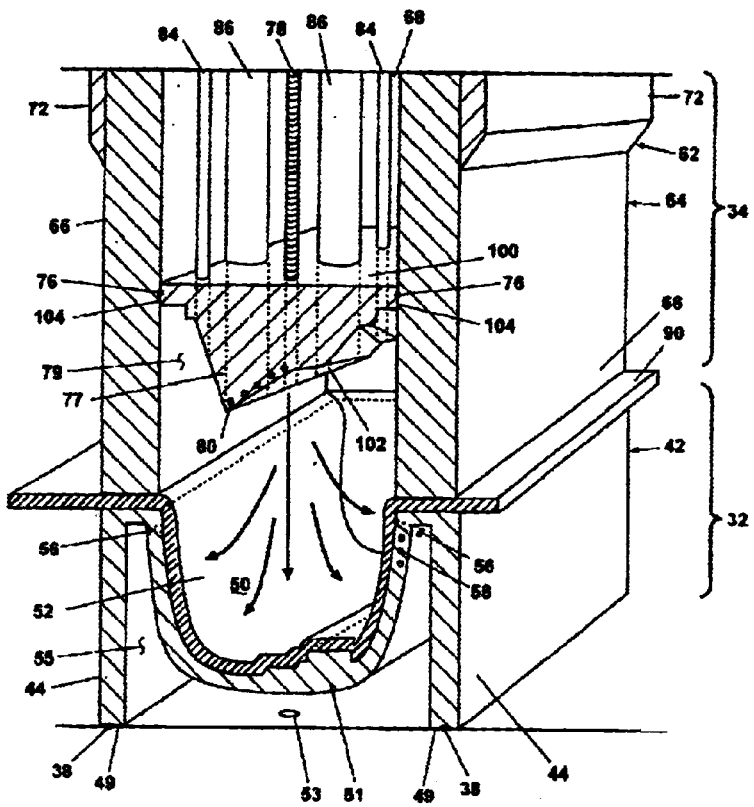
FIG. 9 is a sectioned perspective view of a part of the thermoforming apparatus of FIG. 7 showing the drawing of the fascia against the cavity tool by the introduction of air into the previously evacuated core cavity.
Figure 10:
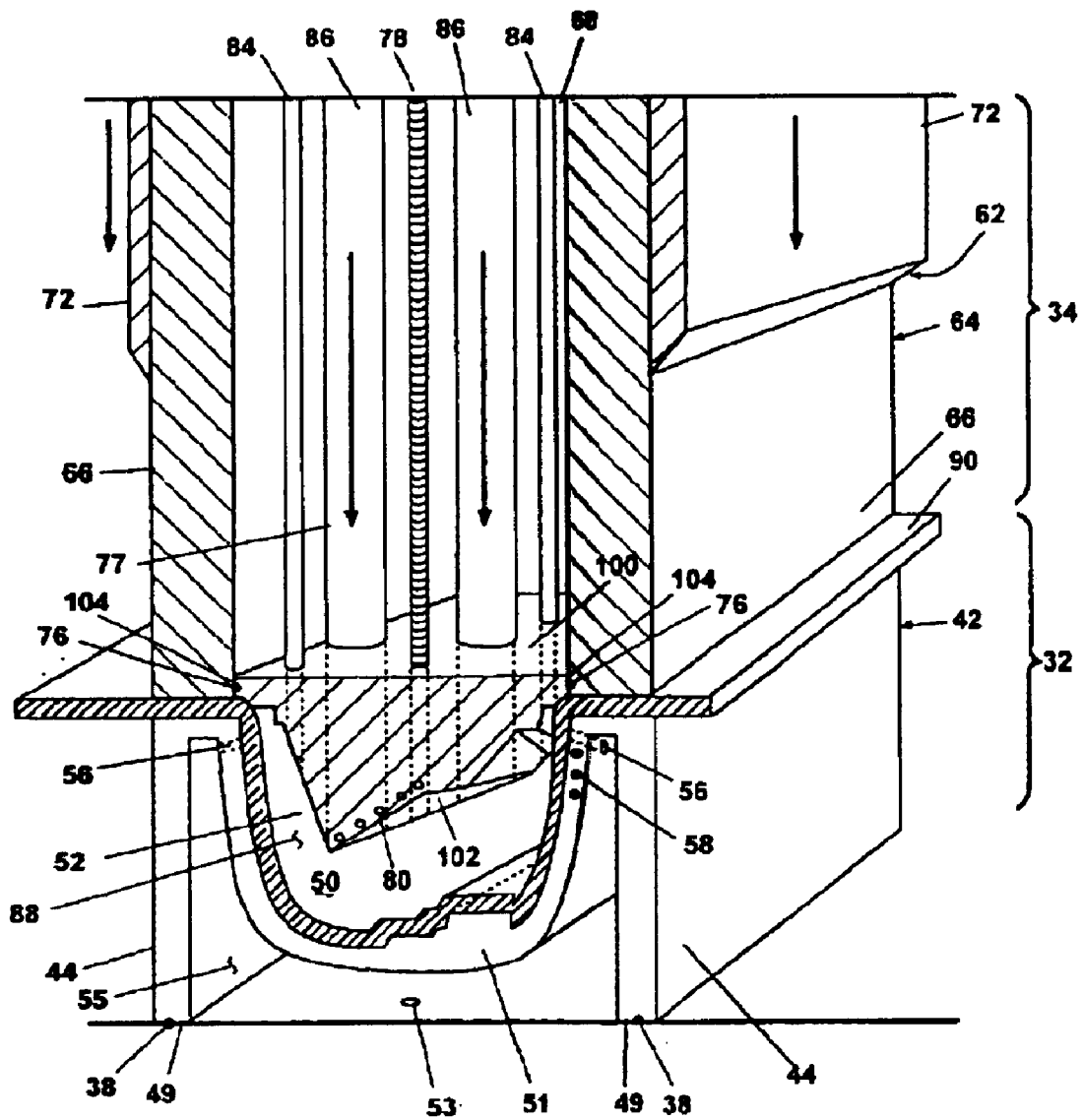
FIG. 10 is a sectioned perspective view of a part of the thermoforming apparatus of FIG. 7 showing the repositioning of a core mold of the core tool into abutment with the fascia to define rear wall of the cavity.

Referring to FIG. 5, the fascia material 90 is initially heated, preferably by the radiant heat source 36. The heated sheet is then positioned between the cavity tool 32 and the core tool 34 (FIG. 6) and then lowered onto the cavity tool 32 to rest on the top edge 48. The ring die 64 is then lowered (FIG. 7) to clamp the sheet 90 around its perimeter between the top edge 48 of the cavity tool 32 and the bottom edge 49 of the ring die 64. A vacuum is then introduced into the cavity 50 and the ring die cavity 79 (FIG. 8) concurrently so that there is no pressure differential across the sheet 90. Referring to FIG. 9, the air valve is then actuated so that air is introduced into the ring die cavity 79 while the vacuum is maintained in the cavity 50. The sheet 90 is thereby brought into contact with the surface 52 where the surface of the fascia 24 contacting the surface 52 forms the fascia exterior profile 54. In FIG. 10, the core mold 77 is lowered into the cavity 50 in proximity to the fascia 24 to create a forming gap 88, which is the space between the upper surface of the material 90 and the core mold surface 102.

Figure 11:
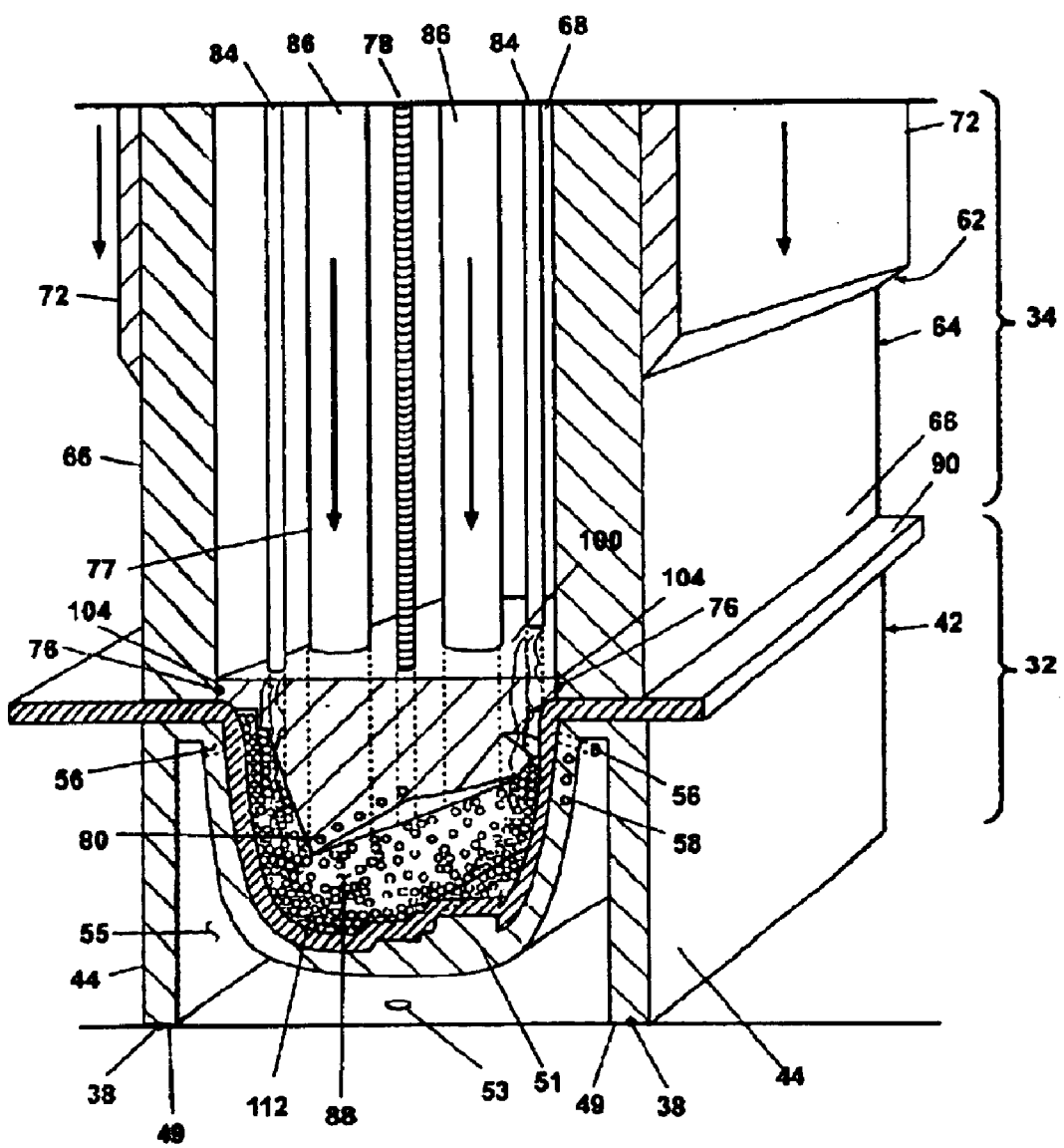
FIG. 11 is a sectioned perspective view of a part of the thermoforming apparatus of FIG. 7 showing the introduction of foam beads and steam into the cavity defined by the fascia and core mold to form the energy absorber.

In FIG. 11, foam beads 112 are introduced through the bead conduit 86 to completely fill the forming gap 88. In the preferred embodiment, the bead source 108 is pressurized. The beads 112 are introduced through the bead conduits 86 from the pressurized bead source 108 while a vacuum is applied to the forming gap 88 through the vacuum conduits 78, which causes the beads to completely fill the forming gap 88. In the preferred embodiment, the foam beads consist of expanded polypropylene beads. The core 77 is then moved an additional preselected distance toward the cavity tool to tightly pack and partially crush the beads in the forming gap 88, which controls the density of the resulting foam. Steam is then introduced into the forming gap 88 and beads through the steam conduits 84. The steam fuses the foam beads together into the energy absorber layer 98. Cooling water is then introduced into the cooling passageways 58, 80 to cool the fascia 24 and energy absorbing layer 98. After cooling, the ring die 64 and core mold 77 are retracted and the fascia assembly 26 is removed from the mold 30. Pressurized air may be introduced through the vacuum conduits 56 to assist in the separation of the mold 30 and fascia assembly 26.

Figure 12:
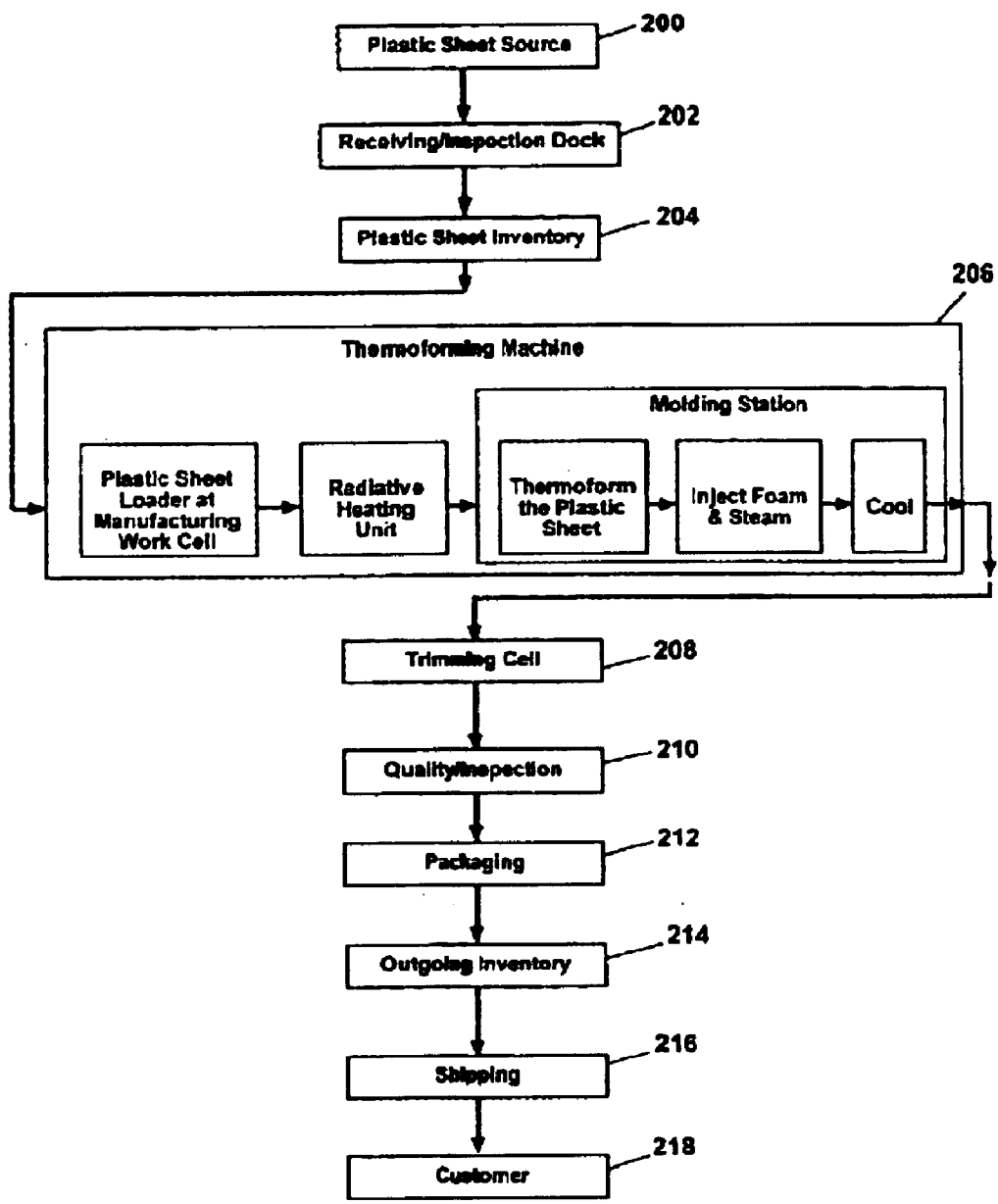
FIG. 12 is a flowchart of the manufacturing process for manufacturing a fascia with integrated energy absorber of FIG. 2.

The aforementioned thermoforming steps are part of an integrated manufacturing and shipping process described in FIG. 12. Referring to FIG. 12, the plastic sheet material is obtained from a source 200, received at the manufacturing facility 202, and entered into inventory at the manufacturing facility 204. The sheet material proceeds through the thermoforming process 206 as previously described. After removal from the mold 30, the fascia assembly 26 is trimmed in a trimming cell 208. The fascia assembly 26 then undergoes a quality control inspection 210 and is then packaged for shipping to a customer 212. The packaged product is entered into outgoing inventory 214, and is then sent to shipping 216 for delivery to the customer 218.

The invention described herein has many benefits over the prior art. First, because the bumper facia is pre-colored, the costs associated with prior art painting processes are eliminated. Further, the outer surface of the bumper facia is far more resistant to chipping and cracking since the colored portion of the bumper facia is sandwiched between the outer topcoat layer and the base layer.

Second, the assembly of the bumper facia with an energy absorber wherein the outer surface of the energy absorber is integrally formed with the inner surface of the bumper facia allows the energy absorber to easily absorb low-speed collisions since this integral formation of the bumper facia with the energy absorber has no space between the bumper facia and the energy absorber. This is in contrast to prior art bumper assemblies in which the energy absorber was a separate member and simply "floated" between the inner surface of the bumper facia and the bumper beam, thus, prior art bumper assemblies were far more susceptible to low-speed collisions wherein the bumper assembly of this invention more easily prevents the damage caused in low-speed collisions while also providing increased impact absorption in high-speed collisions.

Third, the manufacturing process described herein in which both the bumper facia and an integral energy absorber are formed in a single manufacturing process, greatly reduces the time, resources and expense needed to manufacture a bumper assembly.

While the invention has been specifically described in connection with certain specific embodiments thereof, it is to be understood that this is by way of illustration and not of limitation, and the scope of the appended claims should be construed as broadly as the prior art will permit.

What is claimed is:

1. A vehicle comprising:
   a body having a bumper mounting portion thereon;
   a bumper beam mounted to the vehicle bumper mounting portion;
   a fascla mounted to the vehicle in overlying fashion to the bumper beam, said fascia comprised of a single structural layer of polymeric material with the proviso that the polymeric material contains no mineral reinforcement nanoparticles and having a thickness of 2.0 millimeters or less; and an energy absorber integrally formed with the fascia and disposed between the fascia and the bumper beam;
   whereby the fascia and energy absorber can be manufactured, assembled, installed and replaced as a unit.

2. The vehicle of claim 1 wherein the fascia comprises at least two layers of different materials.

3. The vehicle of claim 2 wherein one of the at least two layers comprises an outer layer comprising a transparent top coat material.

4. The vehicle of claim 3 wherein the transparent top coat has a Class A finished surface thereon.

5. The vehicle of claim 3 wherein the fascia further comprises an inner layer colored to have an appearance consistent with the color of the vehicle.

6. The vehicle of claim 5 wherein the structural layer is made of a teas expensive material compared to the cost of the outer and inner layers.

7. The vehicle of claim 5 wherein the outer and inner layers are relatively thin compared to the thickness of the structural layer.

8. The vehicle of claim 1 wherein the structural layer has a thickness of about 1.5 to 2.0 millimeters 9. The vehicle of claim 1 wherein the structural layer is formed from recycled materials.

10. The vehicle of claim 1 wherein the energy absorber is formed from beads of expanded polypropylene.

11. The vehicle of claim 1 wherein the energy absorber and the fascia an be shipped as a unit due to the integral formation of the energy absorber and the fascia.

12. A bumper comprising:
   a bumper beam for mounting to a vehicle;
   a fascia for mounting to the vehicle in overlying fashion to the bumper beam, said fascia comprised of a single structural layer of polymeric material with the proviso that said polymeric, material contains no mineral reinforcement nanoparticles and having a thickness of 2.0 millimeters or less; and
   an energy absorber integrally formed with the fascia and disposed between the fascia and the bumper beam;
   whereby the fascia and energy absorber can be manufactured, assembled, installed and replaced as a unit.

13. The bumper of claim 12 wherein the fascia comprises at least two layers of different materials.

14. The bumper of claim 13 wherein one of the at toast two layers comprises an outer layer comprising a transparent top coat material.

15. The bumper of claim 14 wherein the transparent top coat has a Class A finished surface thereon.

16. The bumper of claim 14 the other of the at least two layers comprises an inner layer colored to have an appearance consistent with the color of the vehicle interposed between the outer layer and the structural layer.

17. The bumper of claim 16 wherein the structural layer is made of a less expensive material compared to the cost of the outer and inner layers.

18. The bumper of claim 16 wherein the outer and inner layers are relatively thin compared to the thickness of the structural layer.

19. The bumper of claim 12 wherein the structural layer has a thickness of about 1.5, to 2.0 millimeters.

20. The bumper of claim 12 wherein the structural layer is formed from recycled materials.

21. The computer of claim 12 wherein the energy absorber is formed from beads of expanded polypropylene.

22. The bumper of claim 12 wherein the energy absorber and the fascia can be shipped us a unit due to the integral formation of the energy absorber and the fascia.

23. A fascia assembly for a vehicle bumper comprising:
a fascia comprising a single structural layer of polymeric material with the proviso that the polymeric material contains no mineral reinforcement nanoparticles, said structural layer having a thickness of 2.0 millimeters or less, said fascia further having an inner surface and an outer surface, the outer surface having an aesthetic appearance consistent with the styling of a preselected vehicle: and an energy absorber farmed integrally with the inner surface of the fascia.

24. The fascia assembly of claim 23 wherein the fascia comprises at least two layers of different materials.

25. The fascia assembly of claim 24 wherein one of the at least two layers comprises an outer layer comprising a transparent top coat material.

26. The fascia assembly of claim 25 wherein the transparent top coat has a Class A finished surface thereon.

27. The fascia assembly of claim 25 wherein the other of the at least two layers comprises an inner layer colored to have an appearance consistent with the color at the preselected vehicle.

28. The fascia assembly of claim 27 wherein the structural layer is made of a less expensive material compared to the cost of the outer and inner layers.

29. The fascia assembly of claim 27 wherein the outer and inner layers are relatively thin compared to the thickness of the structural layer.

30. The fascia assembly of claim 23, wherein the structural layer has a thickness of about 1.5 to 2.0 millimeters.

31. The fascia assembly of claim 23 wherein the structural layer is formed from recycled materials.

32. The fascia assembly of claim 23 wherein the energy absorber is formed from beads at expanded polypropylene.

33. The fascia assembly of claim 23 wherein the energy absorber and the fascia can be shipped as a unit due to the integral formation of the energy absorber and the fascia.

34. The fascia assembly of claim 23 the single structural layer has an inner and outer surface, the inner surface of the single structural layer forming the inner surface of the fascia.

35. The vehicle of claim 10, wherein the fascia and energy absorber are mounted directly to the bumper beam with the proviso that no additional energy absorbing materials disposed inside or between the energy absorber and bumper beam.

36. The bumper of claim 10, wherein the fascia and energy absorber are mounted directly to the bumper beam with the proviso that no additional energy absorbing materials are disposed inside or between the energy absorber and bumper beam.

* * * * *